United States Patent [19]
Saudray et al.

[11] Patent Number: 4,588,507
[45] Date of Patent: May 13, 1986

[54] ELECTROMAGNETIC FILTER

[75] Inventors: Didier Saudray, Orange; Pierre Auchapt, Roquemann, both of France

[73] Assignee: Commissariat a l'Energie Atomique, Paris, France

[21] Appl. No.: 568,741

[22] Filed: Jan. 6, 1984

[30] Foreign Application Priority Data

Jan. 11, 1983 [FR] France ................ 83 00330

[51] Int. Cl.4 .......................................... B01D 35/06
[52] U.S. Cl. ........................... 210/695; 210/223; 210/412
[58] Field of Search ............ 210/222, 223, 274, 412, 210/695

[56] References Cited

U.S. PATENT DOCUMENTS

| | | | |
|---|---|---|---|
| 2,711,248 | 6/1955 | Roe | 210/695 |
| 3,539,509 | 11/1970 | Heitmann et al. | 210/274 |
| 3,838,773 | 10/1974 | Kolm | |
| 4,054,513 | 10/1977 | Windle | 210/222 |
| 4,249,994 | 2/1981 | Dolle | 210/222 |
| 4,282,105 | 8/1981 | Crowe | 210/412 |
| 4,366,065 | 12/1982 | Leslie | 210/223 |

Primary Examiner—John Adee
Attorney, Agent, or Firm—Handal & Morofsky

[57] ABSTRACT

Electromagnetic filter making it possible to continuously discharge filtration products and a corresponding filtration process.

Apart from a conventional filtration section, the filter according to the invention comprises a discharge section and preferably a washing section. A pulsation leg makes it possible to apply to the liquid column a pulsation bringing about a sudden rise of the column and then its slow fall again. Thus, the filtration products are raised and then discharged.

Application to the filtration of solutions containing solid products in suspension.

11 Claims, 5 Drawing Figures

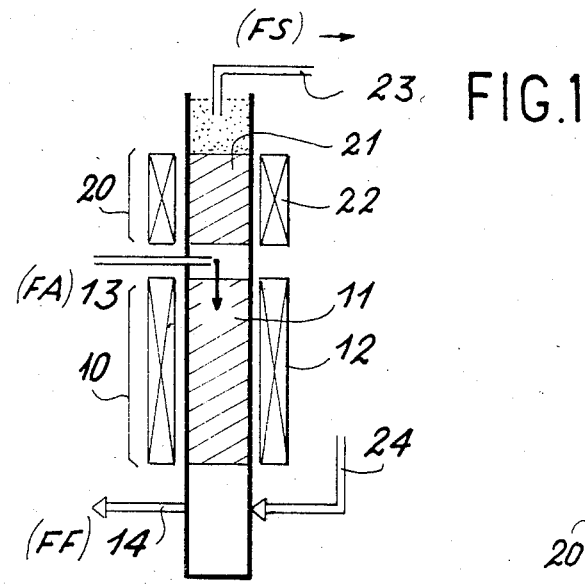
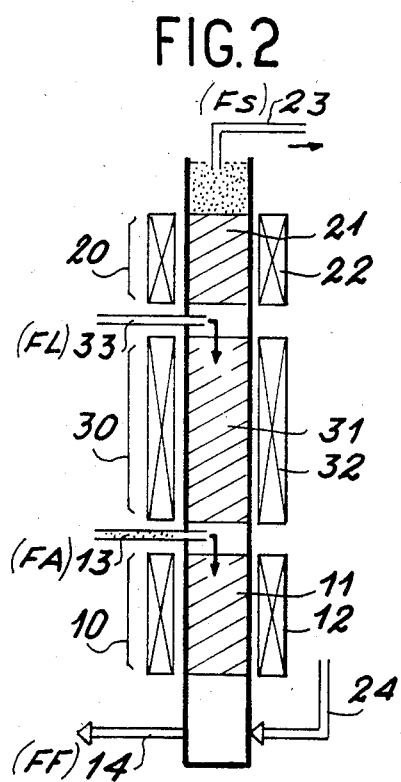
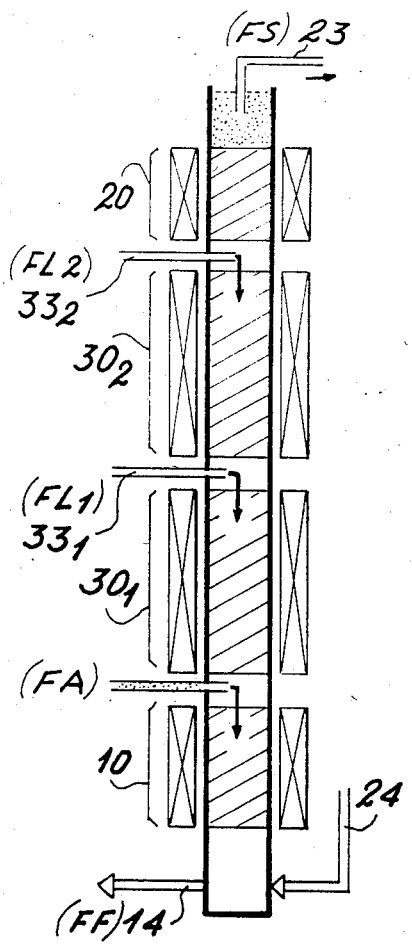

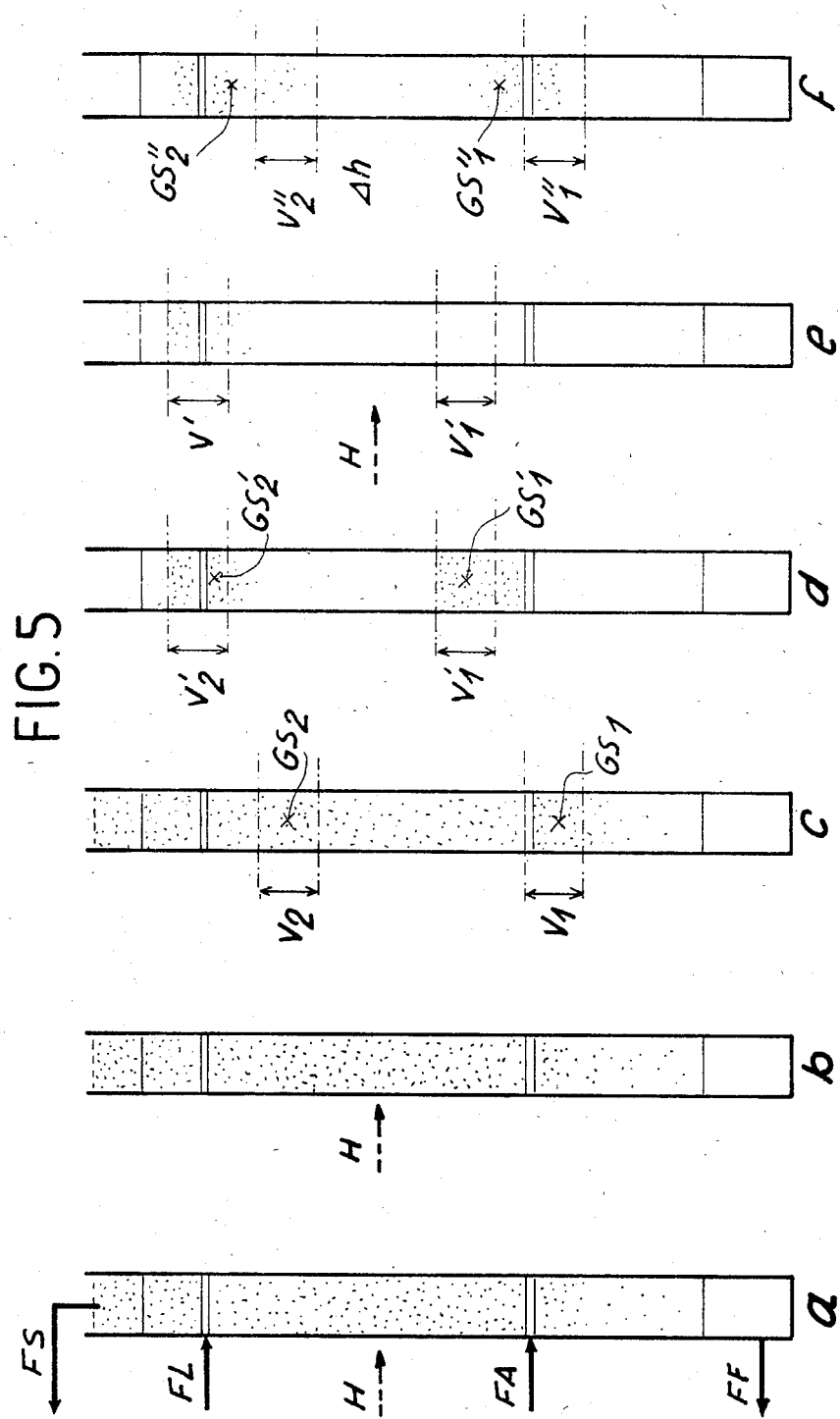

ELECTROMAGNETIC FILTER

BACKGROUND OF THE INVENTION

The present invention relates to an electromagnetic filter permitting the continuous discharge of filtration products and to a filtration process using such a filter. It is more particularly used in the reprocessing of irradiated fuels.

In such an application, a filtering unit must comply with special requirements:

firstly it must ensure an excellent clarification of the solutions resulting from dissolving the substances to be reprocessed, it must permit a very good rinsing of the solids held back in the filter and their discharge in the form of an aqueous suspension, it is desirable that it is able to work continuously its structure must be such that there are no mechanical moving parts and that the pipes and passages are simple, reliable and present in small numbers, it must have the capacity to treat solutions, whose suspensions have a high heat release, without bringing about excessive design and operating constraints, which is necessary for reprocessing solutions from fast neutron reactors.

In the past, these requirements have led to the use of two types of apparatus, namely pendulum-like centrifugal decanters and pulsed filters, the former being more widely used in existing reprocessing plants. However, in the case of the decanters, the clarification obtained is not excellent and the rinsing of the solids makes it necessary to stop the clarifying function. Moreover, they have moving mechanical parts. Finally, the construction of such equipment is difficult and it has not been shown that they can be used with highly exothermic products.

Pulsed filters are constituted by a fritted metal cartridge through which is filtered the solution to be clarified. The filtering principle is very different from that of the present invention.

SUMMARY OF THE INVENTION

The present invention relates to a filter especially designed for this application, to the extent that it permits the continuous discharge of filtration products (i.e. without the complete stopping of the filter, or at least without any prolonged stoppage, whereas a short term disturbance is inevitable) using a simple installation, without moving parts and which can readily cope with the presence of exothermic products in the solution.

The filter according to the invention is of the electromagnetic type. It is known that such a filter is essentially constituted by an envelope made from a non-magnetic material, which is filled with a magnetizable lining and which is placed within a coil. The passage of an electrical current in the coil leads to the appearance of a magnetic field, which has the effect of magnetizing the lining. The lining can be fixed and in the form of wadding, steel wire gauze, or a stack of grids. However, it is usually formed by a bed of steel balls.

The application of a magnetic field to the balls of the lining brings about their magnetization and, correlatively, the appearance of high magnetic field gradients in the spaces between the balls.

When a fluid containing impurities and having appropriate magnetic characteristics, namely a positive magnetic susceptibility (paramagnetic ferromagnetic bodies), and passes through the bed of balls magnetized in this way, the impurities are transferred from areas with a weak magnetic field to areas with a strong magnetic field, i.e. towards the magnetic poles of the balls. As a result of the magnetic forces, the impurities are attached to the balls and the lining then acts as a filter.

Hitherto, such electromagnetic filters have been proposed, particularly in nuclear reactors where they can be used either in the primary circuits, or in the secondary circuits.

The filter according to the invention is of this type and comprises a filtration section constituted by a magnetizable lining associated with means for applying a magnetic field, a pipe for introducing a solution containing the products to be filtered issuing into the upper part of said section and a pipe for extracting the clarified solution issuing into the lower part of said section, wherein the filter also comprises, above the filtration section, a section for discharging the filtration products and which is constituted by a magnetizable lining associated with means for applying a regulatable magnetic field, said discharge section having a discharge pipe issuing into its upper part, whilst the filter also comprises a pulsation leg issuing into the lower part of the filtration section and able to produce at least one pulsation having a first phase in which the column of solution present in the filter is subject to an upward movement and a second phase in which this column is subject to a downward movement.

Preferably, the means for applying the magnetic fields to the linings of the filtration and discharge sections are regulatable in synchronism with the pulsation, in such a way that these fields are able to produce, in the linings of the two sections, the filtration of the solution passing through them during the second pulsation phase, said fields being reduced to a value permitting their entrainment during the second phase.

Preferably, the filter according to the invention also comprises at least one section for the countercurrent washing of the discharged products, said section being positioned between the filtration section and the discharge section and is constituted by a magnetizable lining associated with means for applying a magnetic field regulatable in synchronism with the fields applied to the linings of the filtration and discharge sections, said washing section having a pipe for introducing a washing solution issuing into the upper parts of said section.

Preferably, the pulsation is asymmetrical and comprises a first phase in which the column of solution present in the filter is subject to a rapid upward movement and a second phase in which the column is subject to a slow downward movement.

The present invention also relates to a process for filtering a solution containing the products to be filtered. The process is of the type in which the said solution is introduced into the upper part of a filtration section constituted by a magnetizable lining to which is applied a magnetic field and a clarified solution is extracted from the bottom of this section. This process also comprises an operation for the discharge of the filtration products consisting of applying to the bottom of the filtration section a pulsation consisting of a first phase in which the solution contained in the filter is subject to an upward movement making at least part of the solution pass through a discharge section positioned above the filtration section and constituted by a magnetizable lining, to which is applied a regulatable magnetic field, and a second phase in which the solution is subject to a downward movement making said part again pass through the lining of the discharge section, the discharge of the filtration products taking place through the top portion of the discharge section.

Preferably, to the linings are applied a magnetic field able to bring about a filtration therein during the second pulsation phase and a reduced magnetic field able to reduce said filtration during the first pulsation phase.

In a particular case, a zero magnetic field is applied to the linings during the first pulsation phase.

Preferably, the pulsation is asymmetrical and consists of a rapid upward movement and a slow downward movement.

Preferably, there is also an operation for the countercurrent washing of the discharged filtration products consisting during the first pulsation phase of passing the solution through at least one washing section positioned between the filtration section and the discharge section, said washing section comprising a magnetizable lining to which is applied a regulatable magnetic field, a washing solution being introduced into the upper part of said washing section.

BRIEF DESCRIPTION OF THE DRAWINGS

The invention is described in greater detail hereinafter relative to non-limitative embodiments and with reference to the attached drawings, wherein show:

FIG. 1 a simple variant of the filter according to the invention, in which a filtration section is surmounted by a discharge section.

FIG. 2 a variant also incorporating a washing section.

FIG. 3 a more detailed variant with two washing sections.

FIG. 5 the different phases of the process according to the invention making it possible to understand the operation of the filter.

DETAILED DESCRIPTION OF THE INVENTION

Figure 4:
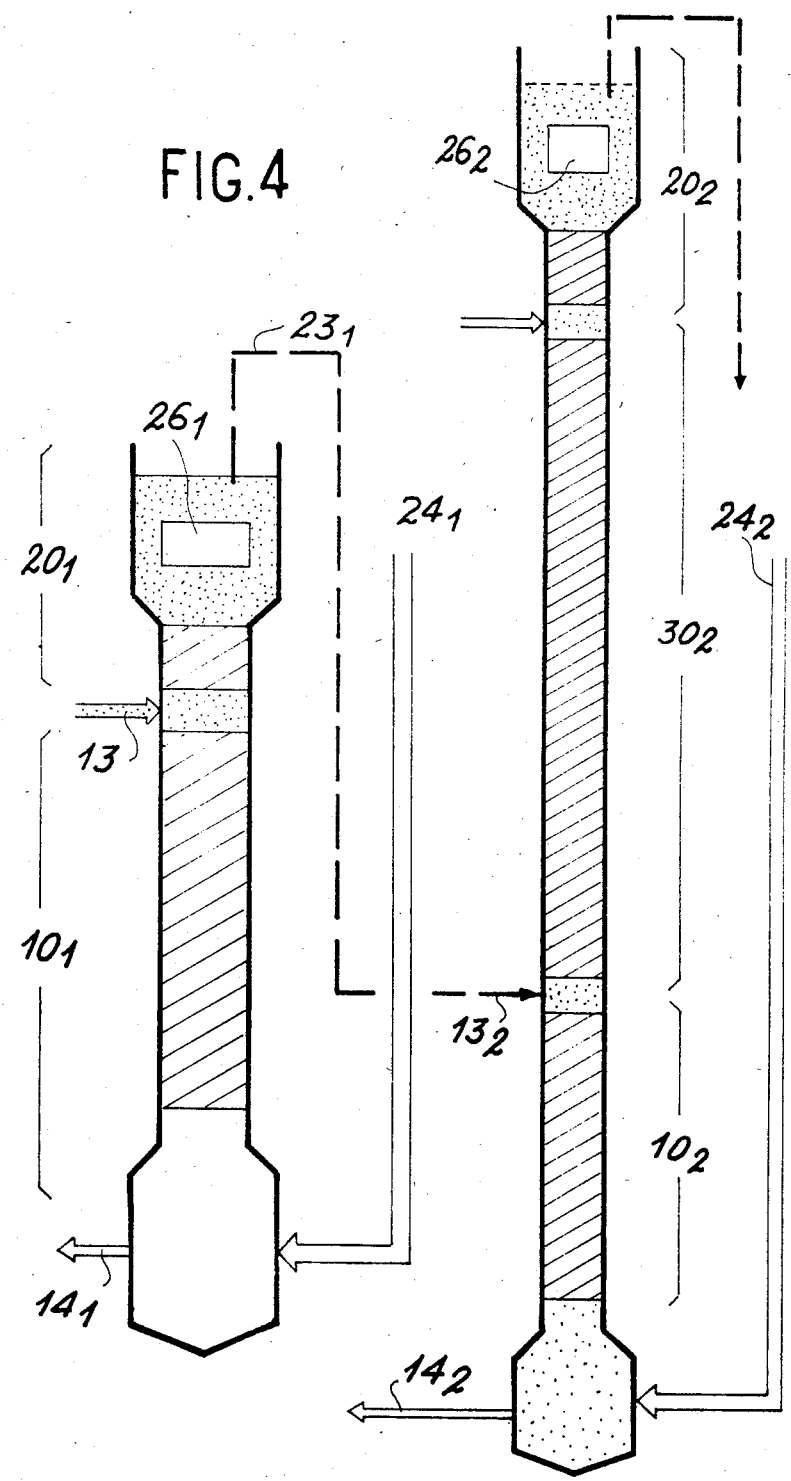
FIG. 4 a filter in which the clarification and washing functions are fulfilled by different filters arranged in series.

Throughout the remainder of the description, it has been assumed that the pulsation is asymmetrical and formed from a fast upward movement and a slow downward movement.

The electromagnetic filter shown in FIG. 1 comprises, in per se known manner, a filtration section 10 constituted by a magnetizable lining 11 associated with means for applying a magnetic field 12. This section is connected to a pipe for introducing a solution containing products to be filtered 13 issuing into the upper part and an extraction pipe of the clarified solution 14 issuing into the lower part of the section. The flows of these two solutions are respectively designated FA and FF. The represented filter is characterized by the fact that it also comprises, above the filtration section 10, a section 20 for discharging the filtration products, which is constituted by a magnetizable lining 21 associated with means for applying a regulatable magnetic field 22. This discharge section has a discharge pipe 23 issuing into its upper part. Moreover, the filter comprises a pulsation leg 24 issuing into the lower part of filtration section 10. Leg 24 is able to produce at least one asymmetrical pulsation consisting of a first phase, in which the column of solution present in the filter is subject to a rapid upward movement and a second phase in which the column is subject to a slow downward movement.

In the variant illustrated in FIG. 2, the filter also comprises a section 30 for the countercurrent washing of the discharged products, the section being arranged between the filtration section 10 and the discharge section 20. It is constituted by a magnetizable lining 31 associated with a means 32 for applying a regulatable magnetic field, controlled in synchronism with the fields applied to the linings 11 and 21 of the filtration and discharge sections. This washing section 30 has a pipe 32 for introducing a washing solution, issuing into the upper part of said section, the washing solution flow being designated FL.

FIG. 3 shows a filter according to the invention, which comprises several superimposed washing sections $30_1$, $30_2$, each being supplied with washing solution by a separate pipe $33_1$, $33_2$ (e.g. an acid solution and water).

The filter shown in FIG. 4 comprises a first filter without a washing section (filtration section $10_1$ and discharge section $20_1$) and a second filter with a washing section $30_2$, the discharge pipe $23_1$ of the first filter being connected to the pipe $13_2$ for introducing the charged solution from the second filter. This arrangement makes it possible to adapt the dimensions of the filters to their function and in particular to giving the washing section $30_2$ a smaller cross-section than that of the filtration section $10_1$.

In FIG. 4, the means $26_1$, $26_2$ arranged in the upper part of the filters are means for stirring the solution in order to maintain the solid products in suspension.

FIG. 5 shows the different operating phases of the filter according to the invention, in the case where the washing section is present. In its most highly developed variant, the operation comprises the six phases represented by diagrams a to f.

Phase a:

This represents the steady state condition with a charged solution flow FA, a clarified solution flow FF, a washing solution flow FL and a washed solids discharge solution flow FS. During this phase, a magnetic field H is applied to the linings of the different sections.

Phase b:

Flows FA, FL and FS are interrupted.

Phase c:

The magnetic field is interrupted. Volumes $V_1$ and $V_2$ are marked in the drawing and their displacements will be followed in the subsequent phases. The centre of gravity of the solids present in these volumes are designated $GS_1$ and $GS_2$. In this phase c, the centres of gravity naturally coincide with the geometrical centres of the volumes.

Phase d:

The first phase of the asymmetrical pulsation is applied and suddenly displaces the liquid column upwards. Volumes $V_1$ and $V_2$ are at $V'_1$ and $V'_2$. The centres of gravity $GS'_1$ and $GS'_2$ of the suspended products can be slightly lower than the geometrical centres as a result of the fact that these products have much more difficulty in passing through the linings, or as a result of a delay to their initial detachment from the lining. This first asymmetrical pulsation phase makes it possible to tear away the filtration products clogging the lining of the filtration section, raise said products into the washing section and pass the products located in the upper part of said washing section (due to the preceding pulsations) into the discharge section.

Phase e:

The magnetic field is reestablished in the linings. The filtration properties of these linings are restored, which makes it possible to fix the suspended solids.

Phase f:

The second asymmetrical pulsation phase is applied and it brings about a slow downwards movement of the liquid column, the suspended solids being held back in the linings. The centres of gravity $GS''_1$ and $GS''_2$ of the solids are now above the liquid volumes which have returned to positions $V''_1$, $V''_2$, so that overall the solids have been moved towards the top of the filter.

The repetition of such a cycle consequently makes it possible to progressively pass the solids from the filtration section to the rinsing section, with a countercurrent washing in the complete washing section (the washing solution circulating from top to bottom and the solids from bottom to top).

In the illustrated embodiment, the magnetic field is zero during the first pulsation phase, in order to enable the solids to rise through the linings. However, this extreme situation is not obligatory and it is possible to only reduce the field, without eliminating it. In certain cases, it is even possible to maintain it at its nominal value, if the asymmetry between the upward movement and the downward movement of the column is sufficiently marked and permits the entrainment of the solids entrapped in the lining during the rise of the liquid.

What is claimed is:

1. An electromagnetic filter comprising a filtration section which comprises a first magnetizable lining associated with first means for applying a first regulable magnetic field, a first pipe for introducing a solution containing the products to be filtered issuing into the upper part of said filtration section and a second pipe for extracting the clarified solution issuing into the lower part of said filtration section, a discharge section, disposed above the filtration section, for discharging the filtration products said discharge section comprising a second magnetizable lining associated with second means for applying a second regulatable magnetic field, said discharge section having a discharge pipe in communication with its upper part, a pulsation leg in communcation with the lower part of the filtration section and producing, at least one pulsation having a first phase in which the column of solution present in the filter is subject to an upward movement and a second phase in which this column is subject to a downward movement said first and second means for applying said first and second magnetic fields to said first and second linings of the filtration and discharge sections being regulatable in synchronism with said pulsation, these fields producing in said first and second linings of the two sections, the filtration of the solution passing through them during the second pulsation phase, and permitting their entrainment during the second phase.

2. An electromagnetic filter according to claim 1, further comprising at least one washing section for the countercurrent washing of the discharged products, said washing section being positioned between the filtration section and the discharge section and comprising a third magnetizable lining associated with third means for applying a third magnetic field regulatable in synchronism with said first and second fields applied to said first and second linings of the filtration and discharge sections, said washing secion having a pipe for introducing a washing solution issuing into the upper parts of said section.

3. An electromagnetic filter according to claim 2, further comprising several superimposed washing sections, each supplied by a pipe traversed by a separate washing solution.

4. An electromagnetic filter according to claim 2, comprising an additional filter in addition to said filter with at least one washing section, the discharge pipe of the first filter being connected to the pipe for introducing the charged solution into the second filter.

5. An electromagnetic filter according to claim 2, wherein the washing section has a smaller cross-section than that of the filtration section.

6. An electromagnetic filter according to claim 1, wherein the pulsation produced by a leg is asymmetrical and causes a rapid upward movement of a column of solution present in the filter and a slow downward movement of said column.

7. A process for filtering a solution containing magnetic products by means of an electromagnetic filter, the solution being introduced from the upper part of a filtration section constituted by a first magnetizable lining to which is applied a first magnetic field and a clarified solution is extracted from the base of said section, wherein there is also an operation for the discharge of the filtration products consisting of applying to the bottom of the filtration section a pulsation consisting of a first phase in which the solution contained in the filter is subject to an upward movement making at least part of the solution pass through a discharge section positioned above the filtration section and constituted by a second magnetizable lining, to which is applied a second regulatable magnetic filed, and a second phase in which the solution is a subject to a downward movement making said part again pass through the first lining of the discharge section, the discharge of the filtration products taking place through the top portion of the discharge section.

8. A process according to claim 7, wherein there are applied to the first and second linings magnetic fileds able to bring about therein a filtration during the second pulsation phase and reduced magnetic fileds able to reduce said filtration during the first pulsation phase.

9. A process according to claim 8, wherein zero magnetic fields are applied to said first and second linings during the first pulsation phase.

10. A process according to claim 7, wherein there is also an operation for a countercurrent washing of the discharged filtration products consisting, during the first pulsation phase, of passing the solution through at least one washing section positioned between the filtration section and the discharge section, said washing section comprising a third magnetizable lining to which is applied a third regulatable magnetic field, a washing solution being introduced into the upper part of said washing section.

11. A process according to claim 7, wherein the pulsation applied to the bottom of the filtration section is asymmetrical and comprises a first fast upward phase and a second downward phase.

* * * * *